No. 766,417. PATENTED AUG. 2, 1904.
C. A. BOTTORFF.
AUTOMATIC CATCHER FOR TIN PLATE MILLS.
APPLICATION FILED SEPT. 28, 1903.
NO MODEL. 8 SHEETS—SHEET 1.

Fig. 6.

No. 766,417. PATENTED AUG. 2, 1904.
C. A. BOTTORFF.
AUTOMATIC CATCHER FOR TIN PLATE MILLS.
APPLICATION FILED SEPT. 28, 1903.
NO MODEL. 8 SHEETS—SHEET 8.

Witnesses:
Harry D. White
Ray White

Inventor:
Charles A. Bottorff
By John L. Kindt Atty.

No. 766,417. Patented August 2, 1904.

UNITED STATES PATENT OFFICE.

CHARLES A. BOTTORFF, OF CHICAGO, ILLINOIS.

AUTOMATIC CATCHER FOR TIN-PLATE MILLS.

SPECIFICATION forming part of Letters Patent No. 766,417, dated August 2, 1904.

Application filed September 28, 1903. Serial No. 174,873. (No model.)

*To all whom it may concern:*

Be it known that I, CHARLES A. BOTTORFF, a citizen of the United States, residing at Chicago, in the county of Cook and State of Illinois, have invented a certain new and useful Improvement in Automatic Catchers for Tin-Plate Mills, of which the following is a specification.

In the production of tin-plate a number of thin sheets of metal are placed together and passed through rollers. It is necessary that the plate be passed through the rollers several times in order to properly prepare it, and to do this it is necessary that an experienced man stand behind the rollers and catch the plates with a pair of tongs and swing the plate over the top of the rollers, so that it may be again inserted. To properly handle the plates requires great skill and involves considerable time and labor.

The object of this invention is to provide an automatic mechanism which is designed to do away with the skilled labor now required in preparing the plates, and I have therefore provided an apparatus which is adapted to catch the tin-plate after it has passed through the rollers and which will return it again to the first position, so that said plates may be again passed through the rollers.

With the above and other objects in view the invention consists in the novel construction and combination of parts hereinafter more fully described and claimed, and illustrated in the accompanying drawings, in which—

Figure 4:
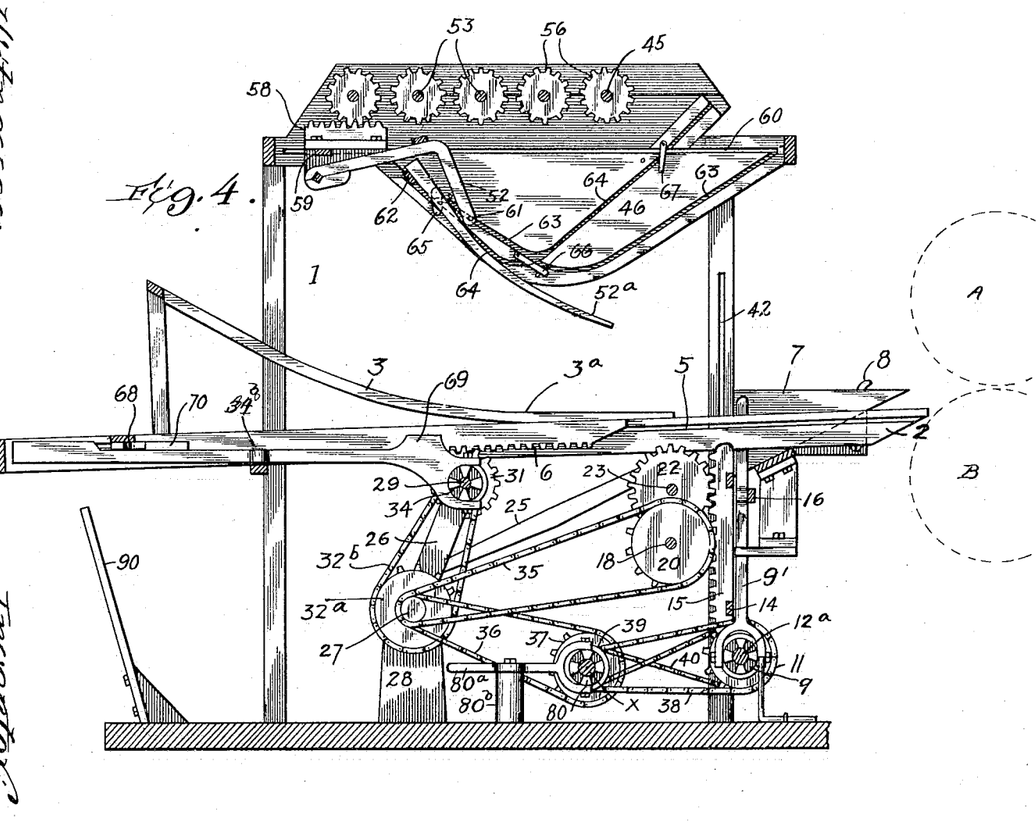
Fig. 4 is a longitudinal section showing the lower carrier in position to receive the tin-plate.

In the drawings, 1 designates the main frame of the apparatus, which is located in the rear of a pair of rolls A B. (Shown in dotted lines in Figs. 1, 4, and 5.) These rolls are of the kind ordinarily used in sheet-mills, and their construction is so well known that it is needless to particularly describe them. Upon the base of frame 1 are two housings 28, one at each side, and in these housings is journaled a shaft 27. Two similar housings 28' on the base of the frame serve to carry the main shaft $x$ of the machine, and the said shaft is provided with a band-wheel $x'$, through which power is communicated to the shaft from any suitable source. The shaft $x$ carries near one end a sprocket-wheel 37, and the shaft 27 carries a sprocket-wheel $20^a$, a sprocket-chain 36 running over the sprocket-wheels 37 and $20^a$ and serving to communicate motion from the main shaft $x$ to the shaft 27, from which motion is communicated to a reciprocating carrier 3, mounted on a rocking frame 2, as will be hereinafter described. The rocking frame 2 is pivotally mounted on rocking arms 26, which are mounted on the shaft 27, the frame being in turn pivotally mounted on the rocking arms by means of depending brackets 30 on each side of the frame, which are pierced for the passage of a shaft 29, carried by the rocking arms 26. The carrier 3 is mounted on the frame 2 and is movable lengthwise thereon, the side arms of the frame being formed with slots 5, in which lugs 4 on the sides of the carrier fit and slide.

Figure 2:
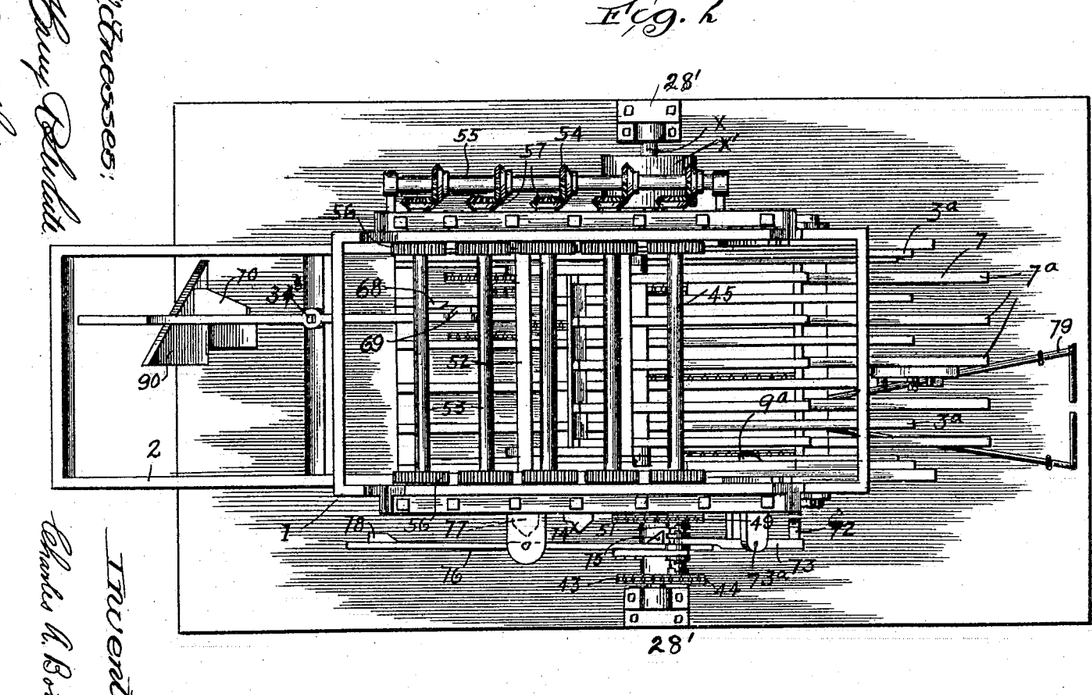
Fig. 2 is a plan view of the same.
Figure 6:
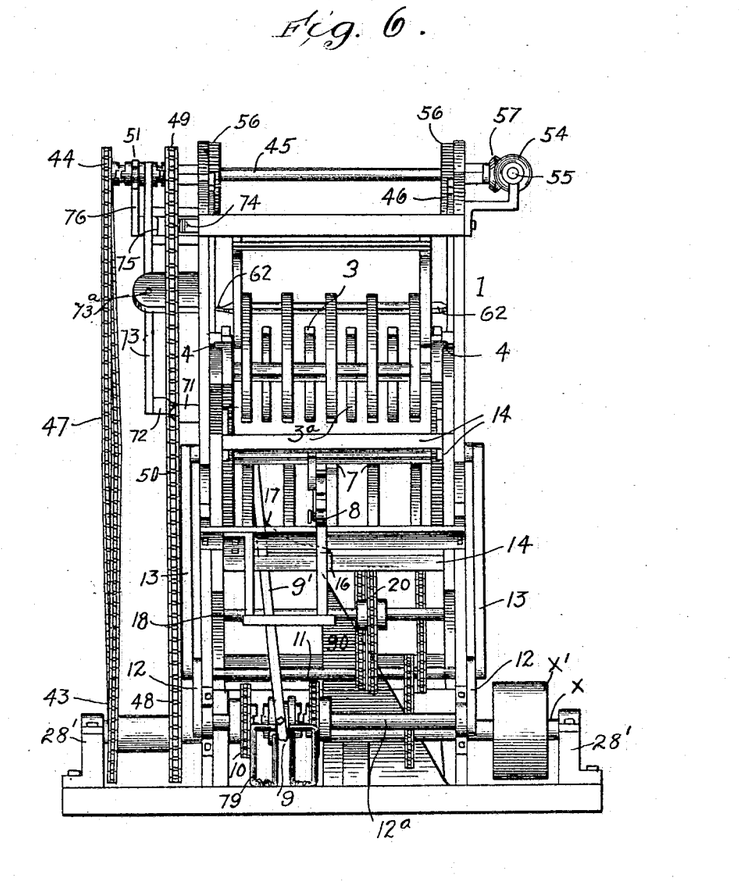
Fig. 6 is a front elevation of Fig. 1.
Figure 7:
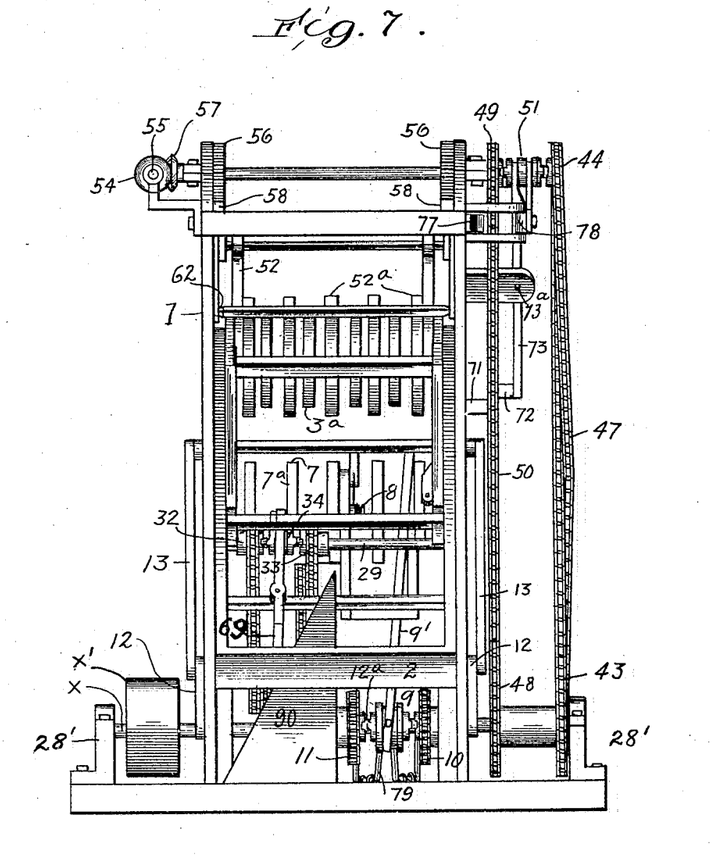
Fig. 7 is a rear elevation of Fig. 1.
Figure 8:
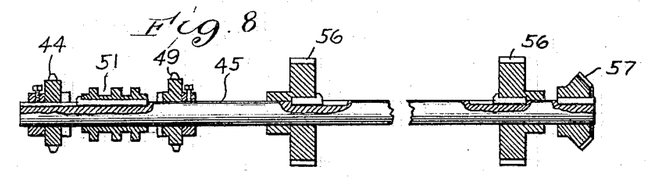
Fig. 8 is a sectional detail of the upper-carrier-operating shaft, gears, and clutch.
Figure 9:
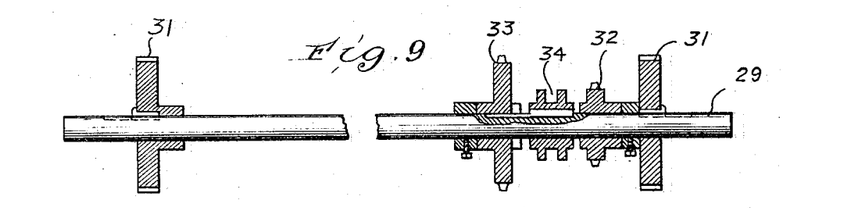
Fig. 9 is a sectional detail of the shaft, gears, and clutch operating the lower carrier.
Figures 10, 11:
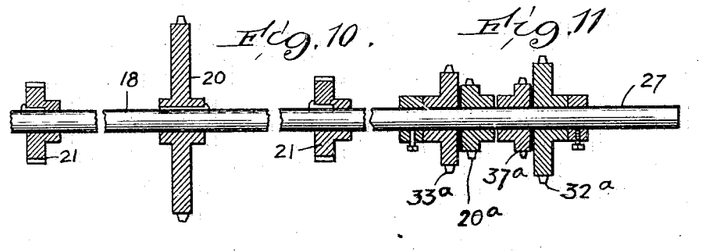
Fig. 10 is a sectional detail of the shaft and gears for moving the lower carrier backward and forward.
Fig. 11 is a sectional detail of the shaft and sprockets for moving the lower carrier and frame backward and forward.
Figure 12:
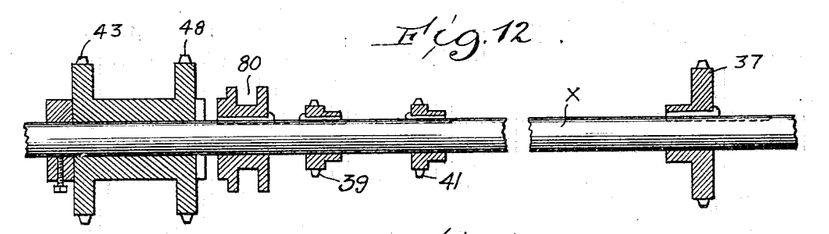
Fig. 12 is a sectional detail of the main-shaft gears and clutch.
Figure 13:
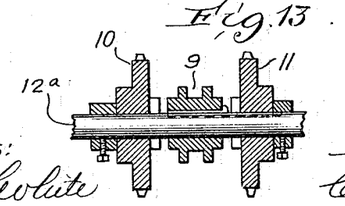
Fig. 13 is a sectional detail of the crank-shaft carrying the reversible clutch mechanism and crank for raising and lowering the front end of the lower-carrier frame.

The carrier 3 is provided with curved arms $3^a$, which are spaced apart, as shown in Figs. 2, 6, and 7, which arms extend when the carrier is at the extremity of its forward movement slightly beyond the end of rocking frame 2.

Figure 5:
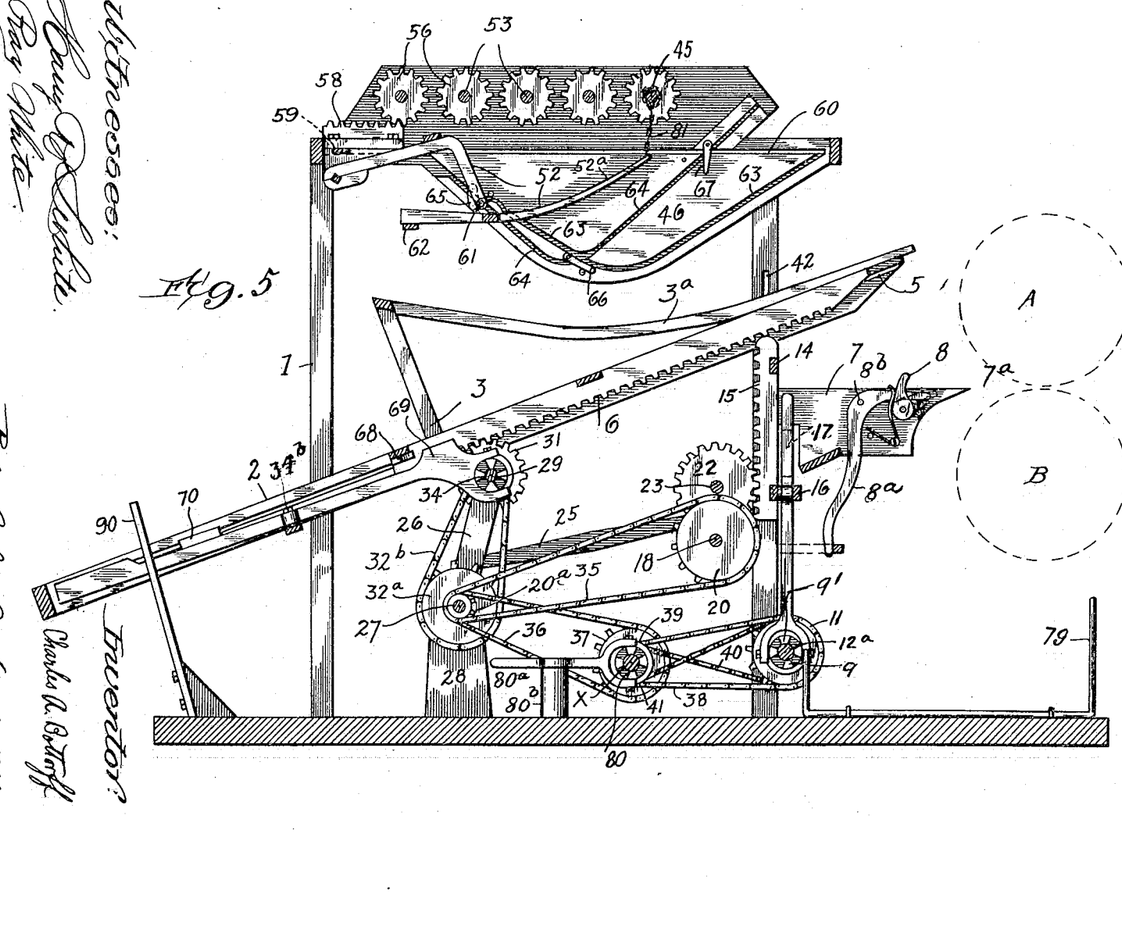
Fig. 5 is a longitudinal section showing the upper carrier in its locked position when not in use and also the trip mechanism for operating the lower carrier.

A rack-bar 6 is carried by the carrier 3, and said rack-bar is engaged by a gear-wheel 31 on the shaft 29, as shown in Fig. 5, so that as the said shaft 29 is turned in one direction the carrier will be moved to the rear. A sprocket 32 on the shaft 29 is geared to a sprocket-wheel $32^a$ on the shaft 27 by a sprocket-chain $32^b$, so that motion communicated to shaft 27 from the main shaft $x$ will, by means of a chain 36, which passes over a sprocket-wheel 37 on the shaft $x$ and over a sprocket-wheel $37^a$ on shaft 27, in turn be communicated to the shaft 29. A double-ended clutch member 34 is splined on the shaft 29 between the sprocket-wheel 32 and another sprocket-wheel, 33, both of which sprocket-wheels 32 and 33 are mounted on shaft 29, each of said sprocket-wheels having a clutch member on their face adjacent to the clutch member 34, and the sprocket-wheel 33 is geared to a sprocket-wheel $33^a$ on the shaft 27. The clutch member 34 is grooved and embraced by the forked arms of a lever 69, which is pivoted at $34^b$ to a cross-bar on the rocking frame 2. Said lever is formed with a beveled lug 70, with which a projection 68 on the reciprocating carrier 3 contacts when the carrier is about reaching its extreme rearward position, said projection serving to shift the position of the clutch member 34, so as to cause it to engage with the clutch member on sprocket 33, and thus cause the carrier to be propelled forwardly, the sprockets 32 and 33 being loose on shaft 29, while the clutch member is splined thereon, as beforesaid, and the shaft 27 receiving motion from a sprocket 20 on shaft 18 and sprocket $20^a$ through a chain 35 in reverse direction to the motion communicated to said shaft 27 from shaft $x$ by sprocket 37 and chain 36.

When the carrier 3 reaches the extremity of its movement toward the front of the rocking frame 2, the clutch member 34 is thrown into engagement with the clutch member on the face of sprocket-wheel 32 by the contacting of lever 69 with a beveled plate 90, projecting upwardly at an angle from the base of the main frame. The contact of lever 69 with the plate 90 and the resultant reversing of the direction motion of the carrier is effected by the rocking of frame 2, which is produced in the following manner: As before mentioned, the frame 2 is pivotally supported on the shaft 29, which is in turn supported in the pivoted rocking arms 26, and thus the frame 2 is capable of a rocking motion on the pivotal point formed by shaft 29 and the brackets 30 and also of a substantially reciprocatory motion by the rocking of the arms 26 on their pivotal point, which is the shaft 27. The rocking motion of the frame is produced through the medium of vertical rack-bar 15, which is secured to a frame 14, which is attached to the rocking frame 2, and a pitman 13, which is attached to the rack-bar at its upper end and at its lower end to a crank 12, carried on a shaft $12^a$. The shaft $12^a$ carries two loosely-mounted sprocket-wheels 10 and 11, having clutch members on their adjacent faces, and between these sprocket-wheels a double-ended clutch member is splined on the shaft, said clutch member 9 being formed with a central groove that is embraced by the forked arms of a shifting-lever 9', which is pivoted at 16 on the main frame 1. The sprocket 10 is connected to a sprocket-wheel 39 on the main shaft $x$ by a straight chain 38, while the sprocket-wheel 11 is connected to a sprocket-wheel 41 on the shaft $x$ by a cross-chain 40. By this means motion will be imparted in one direction or the other to shaft $12^a$ accordingly as the clutch member 9 is caused to engage with one or the other of the clutch members on the sprocket-wheels 10 or 11. A shaft 23 is mounted in suitable bearings 24 on the main frame 1 and carries a gear-wheel 22, that meshes with rack 15, and a pitman 25 is connected to said gear-wheel 22 and to one of the rocking arms 26, so that as the wheel 22 is revolved the arm 26 will be rocked back and forward, carrying with it the frame 2. The gear-wheel 22 also meshes with a pinion 21, which is carried on a shaft 18, mounted in bearings 19 on the main frame 1, and a chain 35 passes around a sprocket-wheel 20, carried by said shaft 18, and around a sprocket-wheel $20^a$ on the shaft 27.

Upon the front of the main frame 1 is mounted a table 7, that receives the plate as it comes from the rolls. This table is formed of a series of vertical plates spaced apart, as shown in Figs. 6 and 7, and to one of these plates is pivoted a trip-lever 8, that engages a substantially L-shaped lever $8^a$, which is pivoted at $8^b$ to the table 7 and which engages a bracket on the lever 9'.

On the base of the main frame 1 is pivoted a shifting-lever 79, which is in engagement with the clutch member 9 and is adapted to be moved by the foot of the operator to throw said clutch member into engagement with one or the other of the sprocket-wheels 10 11.

Upon top of the main frame 1 a movable carrier 58 is arranged, said carrier being composed of sections of angle-iron $58^a$ $58^b$ bolted together, there being two such sections at each side of the frame, the sections on one side being connected to the sections on the other side of the main frame by a cross-bar 59, said carrier being adapted to slide forward and back on the frame and being supported and guided by the ends of cross-bar 59, which fit and slide in horizontal slots 60 in the side plates 52 of the main frame. The carrier 58 has a rack-bar 58' on top, which is adapted to be successively engaged by gear-wheels 56, carried on shafts 53, which are journaled in the side plates 52 of the main frame and have on one end beveled gears 57, meshing with beveled gears 54 on a shaft 55, which is journaled in suitable bearings in the main frame.

A shaft 45, which is arranged parallel with the shafts 53 and also carries gear-wheels 56, projects beyond the side plate 52 on one side of the frame and carries two loose sprocket-wheels 44 49, having clutch members formed on their adjacent surfaces and an intervening double-ended clutch member 51, which is splined on said shaft and embraced by the forked end of a shifting-lever 73, which is pivoted at 73ª in a bracket projecting from the side plate 46 of the main frame and has a lug 72 on its lower end which is engaged by a lug 71 on the rocking frame 2 when the forward end of said frame is lowered. The clutch member 51 is also embraced by the forked ends of a second shifting-lever 76, pivoted at 76ª and provided with beveled projections 75 and 78, which are adapted to be engaged by lugs 74 and 77 on the carriage 58.

The sprocket-wheels 44 and 49 on shaft 45 are geared to sprockets 43 and 48 on the main shaft by a straight chain 46 and a crossed chain 47, and the sprocket-wheels 43 and 48 are both formed integral with a sleeve that runs loosely on the main shaft $x$ and is formed with a clutch member which is adapted to be engaged by a clutch member 80, splined on the main shaft and embraced by the forked arms of a shifting-lever 80ª, which is pivoted upon top of a standard 80ᵇ on the base of the main frame.

Figure 3:
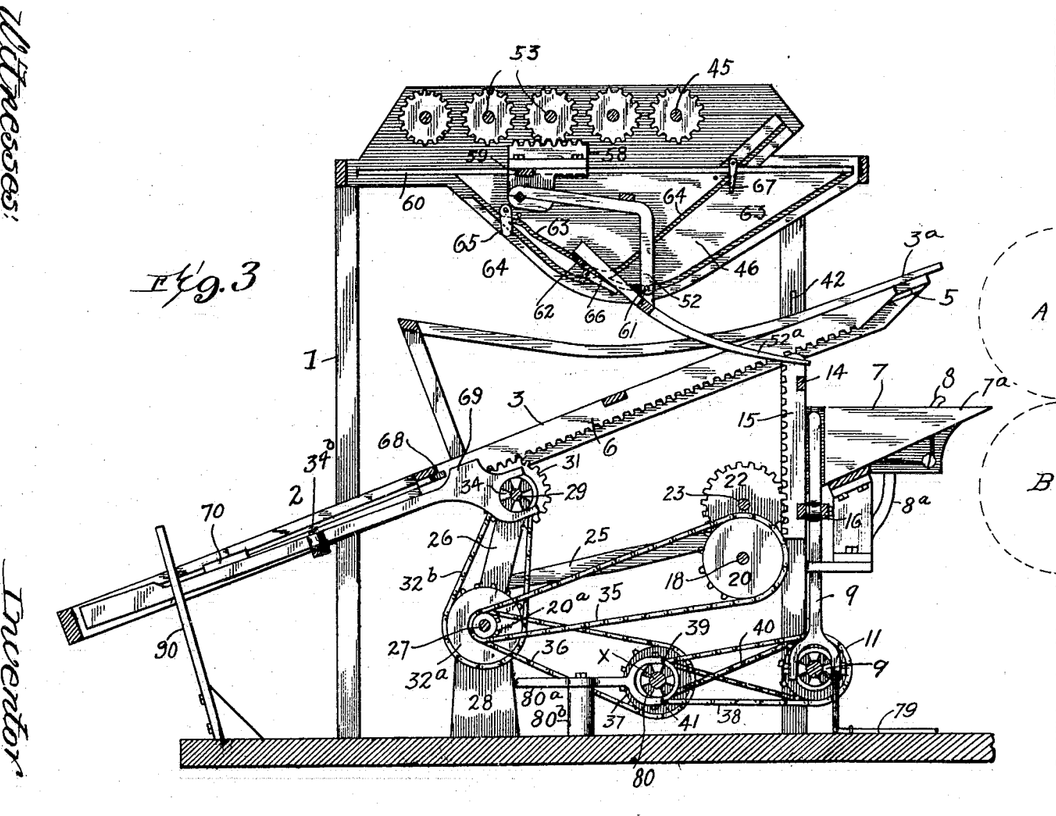
Fig. 3 is a longitudinal section thereof.

The carrier 58 carries L-shaped depending arms 52, to which are pivotally attached curved arms 52ª, which are so spaced as to pass between the curved arms 3ª of the carrier 3 when the latter is in its elevated position, as shown in Fig. 3. The pivot 61, which unites the arms 52 and 52ª, extends laterally beyond said arms and travels in a curved slot 63 in the side plate 46, and a bar 62, which is attached to the inner ends of all the arms 52ª, has projecting ends which work in curved slots 63 in the side plates 46. Pivoted switches 65, 66, and 67 are arranged upon the plates 46, these switches serving to guide and direct the movement of the pivots 61 and the bar 62 in the curved slots 63 and 64, as will be hereinafter described.

Figure 1:
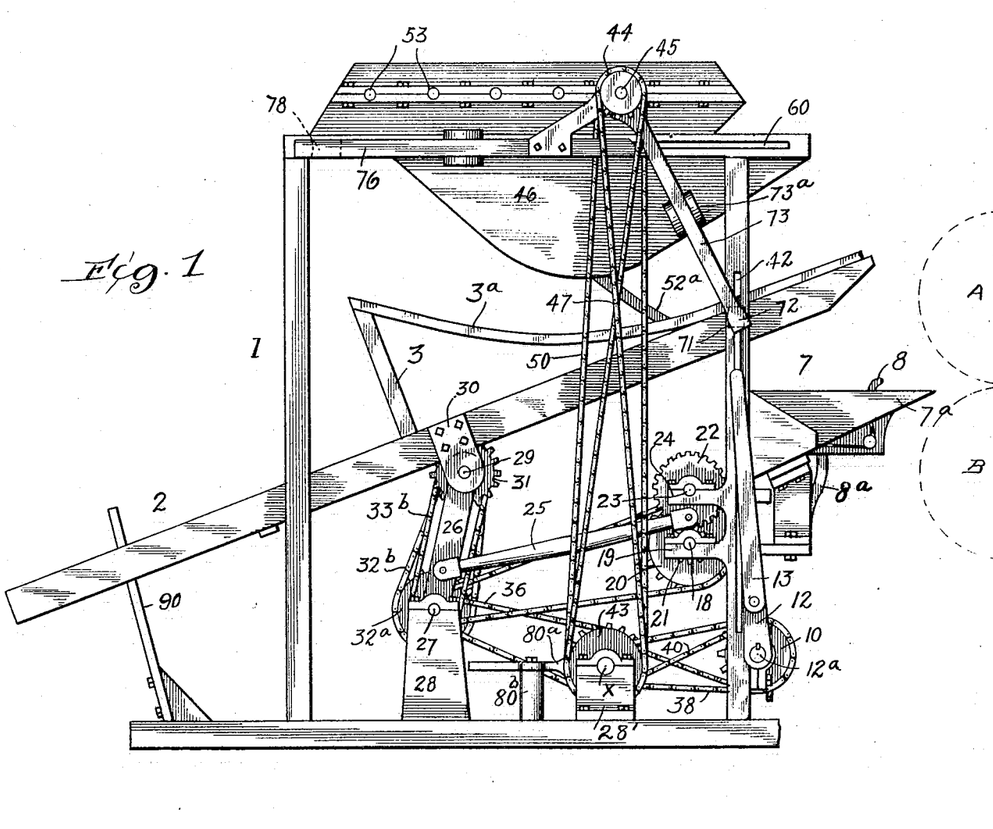
Figure 1 is a side elevation of my improved automatic catcher for tin-plate mills, showing the lower carrier in its raised position and the upper carrier in position to receive the tin-plate therefrom.

The operation of my invention is as follows: Assuming the parts to be in the position shown in Fig. 3 of the drawings, the first treatment of the metal, usually termed "roughing," is as follows: The clutch 9 is out of engagement with both of the sprocket-wheels 10 and 11 and rocking frame 2 is in its raised position and carrier 58 in its central position and clutch 34 in engagement with sprocket-wheel 32. A sheet of metal being passed between the rolls A B slides upon table 7, and striking trip-lever 8 throws lever 9' to one side and causes clutch member 9 to engage sprocket-wheel 11. As the main shaft $x$ is in motion at this time, the shaft 12ª is turned by the engagement of clutch member 9 with sprocket 11, and its revolution causes pitman 13 to draw down the end of rocking frame 2 and with it the rack 15, causing gear 22 to turn and through the pitman 25 and rocking arm 26 imparting a reciprocatory motion to the rocking frame 2 as it descends, which results in the end of the frame clearing the upper roll A and following the curvature of the roll in its descent. At the same time sprocket 20 on shaft 18 is revolved by the engagement of gear-wheel 22 with pinion 21 and imparts motion to shaft 27 by chain 35, from whence motion is communicated to shaft 29 by chain 33ᵇ, and gear-wheel 31 is revolved from right to left and by its engagement with rack 6 causes the carrier 3 to move backwardly into the position shown in Fig. 4. When the carrier 3 reaches its farthest rearward position, the lug 68 strikes the projection 70 on lever 69 and by moving the lever shifts the clutch member 34 out of engagement with sprocket 32 and into engagement with sprocket 33, whereby the carriage 3 is by the reversal of the direction of movement of the shaft 29 caused to move forwardly, a reverse movement being communicated to shaft 27 from main shaft $x$ by chain 36. When the carrier 3 has reached its extreme forward position and has been elevated, as hereinbefore described, the projection 90 on the base of the frame strikes the lever 69 and the clutch member 34 is returned to its original position and the carrier 3 is again moved backwardly. When the carrier 3 has been moved forward in the manner described, which is accomplished while the rocking frame 2 is still in its horizontal position, the continued movement of the shaft 12ª causes the front end of frame 2 to be elevated, thereby elevating the plate of metal which has come through the rolls and is now resting on the arms 3ª to a point above the top of upper roll A. When the rocking frame 2 has reached its elevated position, as shown in Fig. 1, the carrier 58 is caused to travel forward by the motion of gear-wheels 53, which, as before stated, are given motion from the main shaft $x$ by means of sprocket-wheels 43 44, chain 47, shaft 45, beveled gears 54 57, and shaft 55. The arms 52ª of the carrier are by the forward movement of the carrier pushed under the plate on arms 3ª, and the continued movement of the carrier causes the arms 52ª to be elevated by reason of the movement of pivots 61 and rod 62 in the slots 63 and 64, thus raising the plate off the arms 3ª. The further continuation of the movement of the carrier by reason of the divergence of the slots 63 and 64 at their forward ends causes the arms 52ª to descend slightly and discharge the plate over the top of roll A. When the carrier has reached the extremity of its forward movement, the lug 74 strikes the lug 75 on switch-lever 76, which throws the clutch member 51 out of engagement with sprocket-wheel 44 and into engagement with sprocket-wheel 49, whereupon the direction of movement of the carrier 58 is reversed and which then moves backward, and when the carrier has reached the extremity of its backward movement the lug 77 strikes the lug 78 on the switch-lever 76, throwing the clutch member 5 into engagement with sprocket 44 and causing the carrier to again move forward as before.

The switches 65 66, it will be observed, are so arranged that the rod 62 on the backward movement of the carrier will travel up the rear portion of slot 63 and on the forward movement of the carrier will travel down the rear portion of the slot 64, these slots crossing one another at the point where switch 66 is located and merging at the point where switch 65 is located. This movement of the inner end of arms 52$^a$ causes the outer ends of said arms to describe a somewhat irregular but substantially circular movement from right to left or in a direction opposite to the movement of the hands of a clock, so that after discharging a plate, as before described, they will move backwardly, then descend, and then rise up under the plate in the arms 3$^a$.

From the foregoing description it will be observed that a plate resting upon the table 7 will be elevated on arms 3$^a$ by the rocking of frame 2, which while it rocks describes a curve coinciding with the curvature of roll A, so as to avoid contacting with the same. When the plate has been thus raised, the arms 52$^a$ coming forward pass under the plate, lifting it from the arms 3$^a$ and discharging it over top of roll A, and during the descent of the rocking frame 2 the carrier 3 and arms 3$^a$ thereof are moved backward and then forward under the next plate, which has been passed under the rolls and rests on table 7, and that these several motions will be continued so long as the shaft 12$^a$ is kept in motion by the engagement of its clutch member 9 with sprocket-wheels 10 or 11.

Having thus described my invention, I claim—

1. In a machine of the character described, the combination of a receiving-table, a carrier provided with a series of arms adapted to pass under a plate on said table, means for elevating said carrier, a second carrier having arms adapted to project under the plate on the arms of the first-named carrier, and means for elevating the arms of the second carrier to raise the plate from the arms of the first carrier.

2. In a machine of the character described, the combination of a receiving-table, a rocking frame, a carrier longitudinally movable on said rocking frame and adapted to be projected under a plate sustained on said table, means for imparting a motion to said rocking frame and means for longitudinally moving said carriage thereon.

3. In a machine of the character described, the combination of a receiving-table, a rocking frame a carrier longitudinally movable on said rocking frame, a rocking support for said frame, means for rocking said frame and for simultaneously rocking its support, and means for imparting a reciprocating movement to said carrier.

4. In a machine of the character described, the combination of a main frame, a receiving-table mounted thereon, a rocking frame, means for rocking said frame, a sliding carrier mounted on said rocking frame, projecting arms on said carrier, means for imparting reciprocatory movement to said carrier, a second carrier movably mounted on said main frame above the rocking frame, pivoted arms carried by said second carrier and adapted to project between and below the arms of the first-named carrier when the latter is in its elevated position, means for reciprocating said second-named carrier and means for raising and lowering said pivoted arms.

5. In a machine of the character described, the combination of a main frame, a receiving-table composed of plates spaced apart, a rocking frame composed of a series of plates registering with the spaces between the plates of the table and adapted to pass through such spaces, means for rocking said frame, a carrier movably mounted on said frame, means for moving said carrier and for automatically reversing the movement of the same.

6. In a machine of the character described, the combination of a main frame, a receiving-table thereon, a rocking frame, means for rocking said frame, a reciprocating carrier mounted on said rocking frame, means for reciprocating said carrier, a second reciprocating carrier mounted on the main frame, means for imparting reciprocatory motion thereto, a power-shaft and intermediate mechanism between said power-shaft and the means for reciprocating each of said carriers, whereby they will be successively reciprocated in the same direction, said second carrier being provided with arms adapted to project under a plate on the first-named carrier and raise it therefrom.

7. In a machine of the character described, the combination of a receiving-table, a rocking frame, a reciprocating carrier mounted on said frame, means for imparting motion to said rocking frame, means for imparting motion to said carrier, a main shaft, gearing and connections for imparting motion from said main shaft to said carrier a supplemental shaft, gearing and connections between said main shaft and said supplementary shaft, a pitman connected to said rocking frame and said supplementary shaft, a clutch on said supplementary shaft adapted to bring into operative connection the main and supplementary shafts and a tripper on said receiving-table adapted to operate said clutch.

8. In a machine of the character described, the combination of a main frame a receiving-table, a rocking frame, a reciprocating carrier mounted on said rocking frame, means for rocking said frame, a rack-bar on said carrier, a shaft journaled on said frame, a gear on said shaft, meshing with said rack-bar, means for alternately turning said shaft in opposite direction to move the carrier to and fro, and means for automatically reversing the motion of said shaft.

9. In a machine of the character described, the combination of a main frame, receiving-table, a rocking frame, a reciprocating carrier mounted on said frame, a rack-bar on said carrier, a gear-wheel meshing with said rack-bar, means for imparting motion to said rocking frame and motion alternately in different directions to said gear-wheel, a second reciprocating carrier mounted on said main frame above the first-named carrier, a rack-bar on said second carrier, gear-wheels adapted to engage the rack-bar on the second carrier, means for imparting movement in alternately-opposite directions to said gear-wheels and arms arranged on said second carrier adapted to lift a plate from said first-named carrier.

In testimony whereof I have signed my name to this specification in the presence of two subscribing witnesses.

CHARLES A. BOTTORFF.

Witnesses:
W. R. GREEN,
K. SCHAFF.